Figure 1:
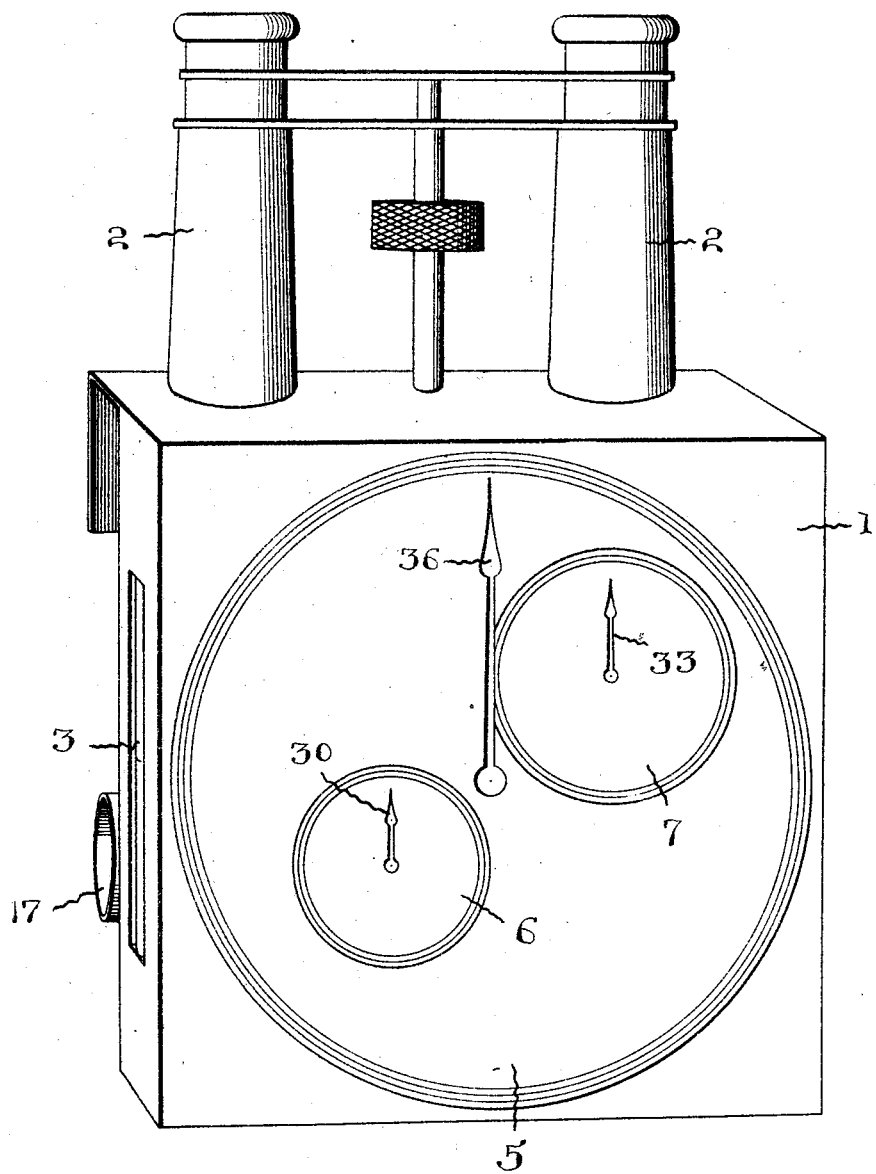

No. 767,847. PATENTED AUG. 16, 1904.
J. G. STEWART.
OPTICAL MEASURING INSTRUMENT.
APPLICATION FILED JULY 1, 1903. RENEWED JULY 5, 1904.
NO MODEL. 5 SHEETS—SHEET 1.

Witnesses
Inventor
James Gordon Stewart.
By Victor J. Evans
Attorney

No. 767,847. PATENTED AUG. 16, 1904.
J. G. STEWART.
OPTICAL MEASURING INSTRUMENT.
APPLICATION FILED JULY 1, 1903. RENEWED JULY 5, 1904.
NO MODEL. 5 SHEETS—SHEET 2.
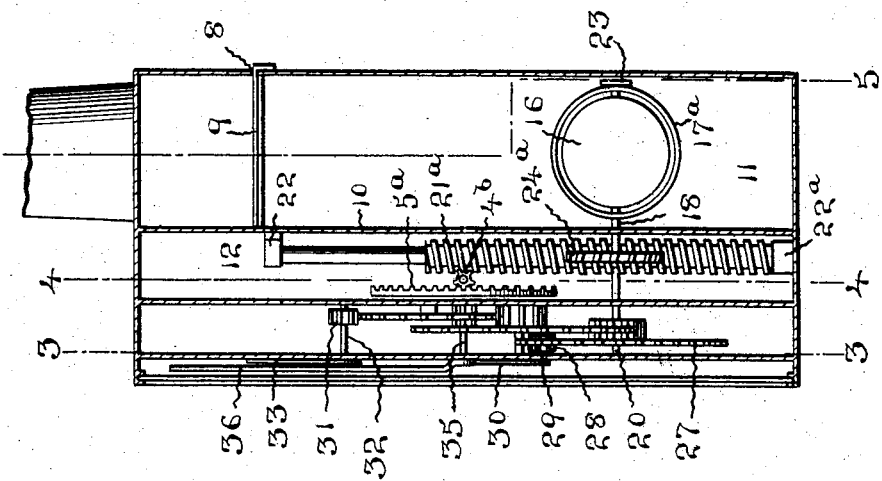
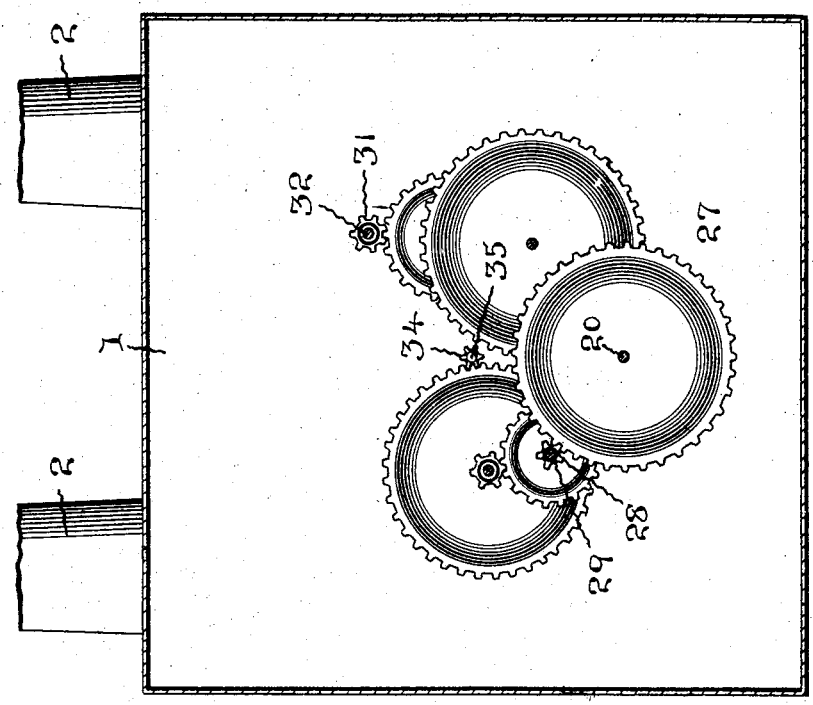
Witnesses
Inventor
James Gordon Stewart
By Victor J. Evans
Attorney

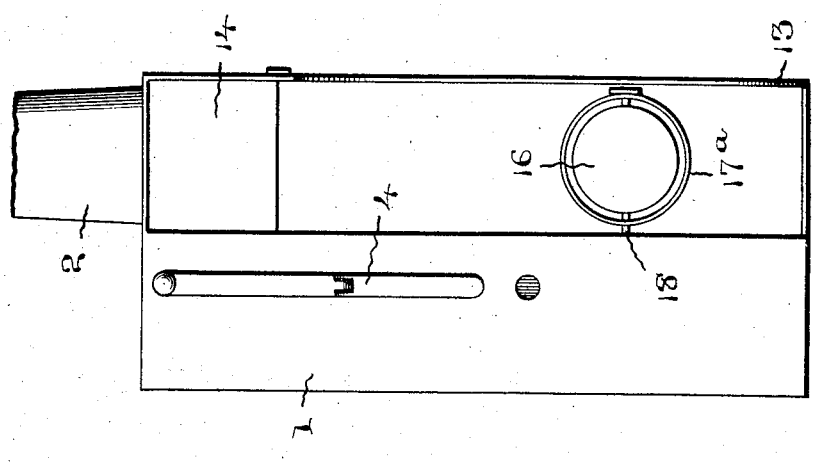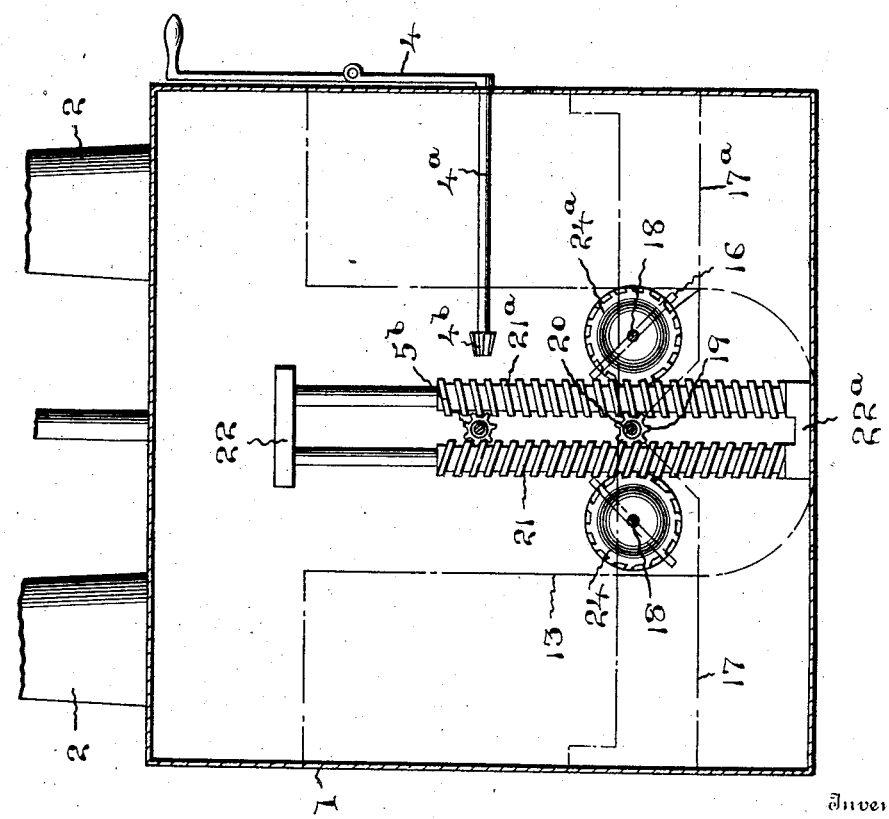

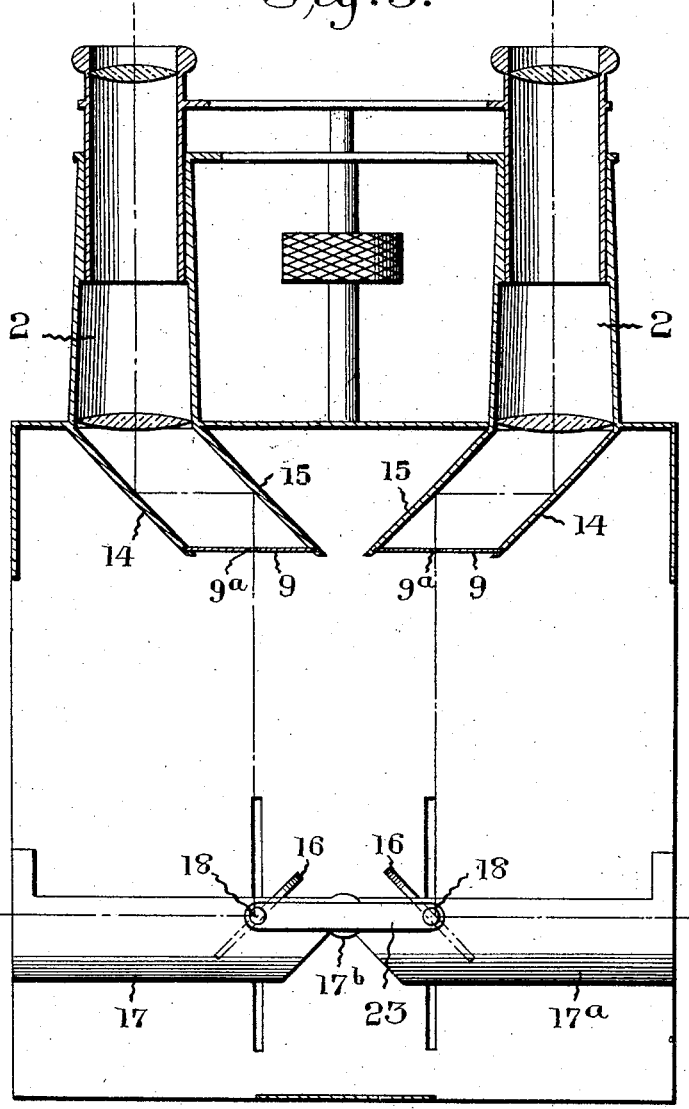
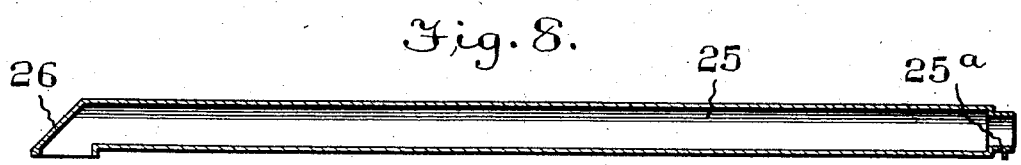

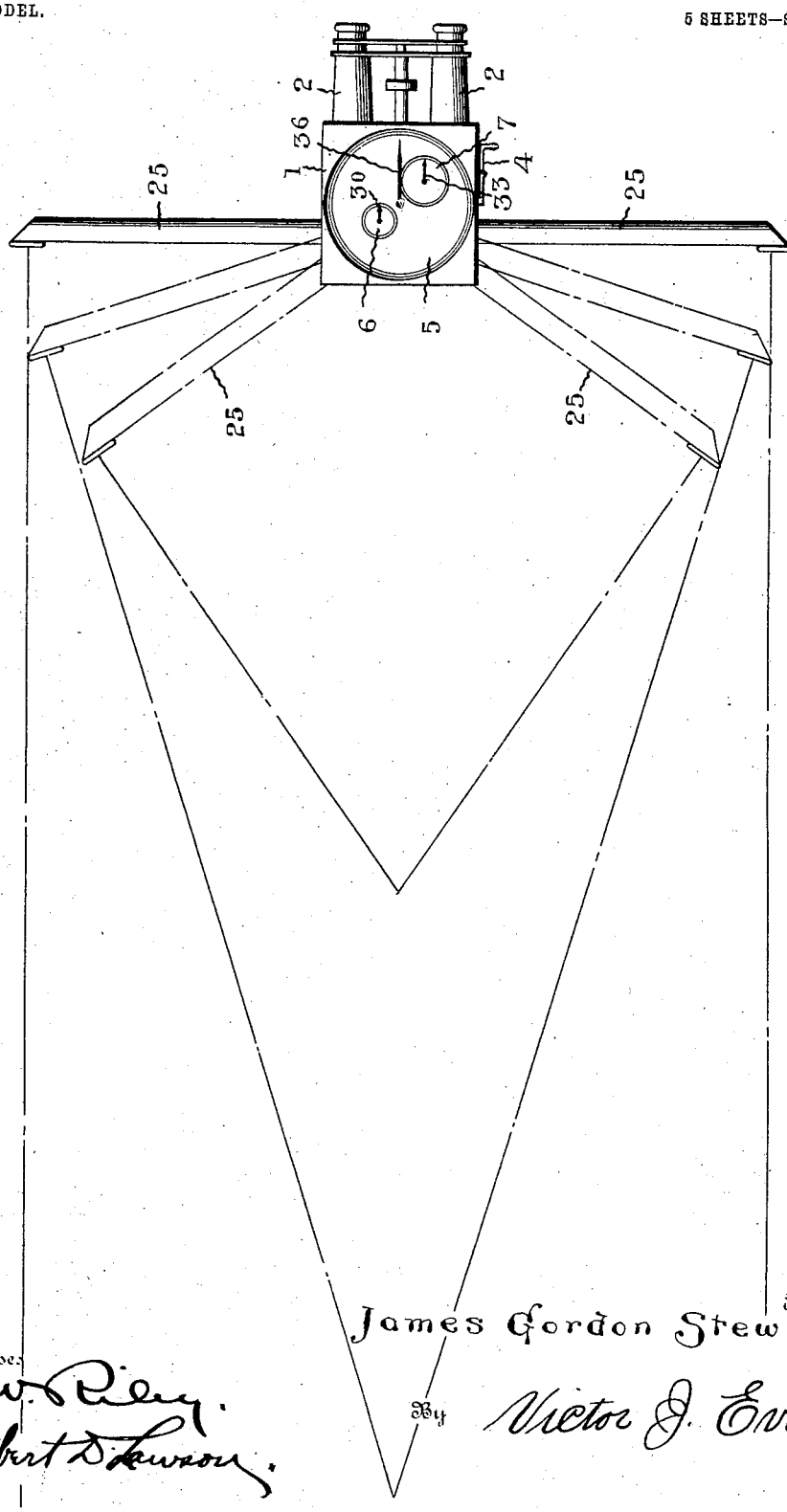

No. 767,847.

Patented August 16, 1904.

UNITED STATES PATENT OFFICE.

JAMES GORDON STEWART, OF PIETERMARITZBURG, NATAL.

OPTICAL MEASURING INSTRUMENT.

SPECIFICATION forming part of Letters Patent No. 767,847, dated August 16, 1904.

Application filed July 1, 1903. Renewed July 5, 1904. Serial No. 215,396. (No model.)

*To all whom it may concern:*

Be it known that I, JAMES GORDON STEWART, a subject of the King of Great Britain, residing at Pietermaritzburg, Natal, South Africa, have invented new and useful Improvements in Optical Measuring Instruments, of which the following is a specification.

My invention relates to new and useful improvements in optical measuring instruments; and its object is to provide a device by means of which the distance from the base thereof to any object upon which the instrument is focused may be accurately indicated mechanically.

A further object is to provide a device of this character adapted to indicate the angle to the horizontal of a line from the base of the instrument to the object upon which said instrument is focused, and the angle and distance having been obtained the altitude may be readily computed.

A further object of the invention is to provide an optical instrument of this character which is extremely compact and can be readily adjusted so as to focus upon the desired object.

A further object is to provide mechanism whereby the angle or the distance measured will be accurately indicated upon the instrument.

With the above and other objects in view the invention consists in the novel construction and combination of parts hereinafter more fully described and claimed, and illustrated in the accompanying drawings, showing the preferred form of my invention, and in which—

Figure 1 is a perspective view of the device with all of the parts in their normal positions. Fig. 2 is a vertical transverse section. Fig. 3 is a section on line 3 3, Fig. 2. Fig. 4 is a section on line 4 4, Fig. 2. Fig. 5 is a section on line 5 5, Fig. 2. Fig. 6 is a side elevation. Fig. 7 is a diagrammatical view showing the telescopes focused upon different points, and Fig. 8 is a longitudinal section through a telescope.

Referring to the figures by numerals of reference, 1 is the casing of the instrument, and a binocular 2 is arranged upon the back thereof and a level 3 in the left side and an operating-handle 4 on the right side. A dial 5 is arranged upon the face of the casing, and a smaller dial 6 is also arranged upon said face and is graduated to indicate any prearranged number of revolutions of the dial 5. This dial 5 may, if desired, have any suitable graduations thereon to indicate distances. Another small dial 7 is arranged on the face aforementioned and is graduated to indicate the degrees of an angle. A slot 8 is provided in the casing at each side at the opening between mirrors, hereinafter mentioned, for the insertion of slides 9. A horizontal partition 10 is located within the casing and divides the same into two compartments 11 and 12, respectively. The binocular opens into compartment 11, which is open at the sides and has only a small support 13 in the center of the front, while compartment 12 contains mechanism for indicating mechanically the distances and angles measured by the device. Mirrors 14 are arranged within the casing, at the back thereof and in direct range with the binocular, and these mirrors are inclined in opposite directions at angles of forty-five degrees. A mirror 15 is arranged parallel to each of the mirrors 14 and directly behind rocking mirrors 16, which are arranged at the inner ends of holders 17 and 17$^a$ and are mounted at their centers upon revoluble pins 18. The back portion of holders 17 and 17$^a$ is open, so as to permit the rays deflected by mirrors 15 to be received by mirrors 16. Slides 9 aforementioned are provided with circular openings 9$^a$ in different convenient sizes to limit the field in proportion to the distance of the object focused.

The holders 17 and 17$^a$ are mounted at their inner ends upon a common axis 17$^b$. A gear 19 is mounted on an extension 20 of the bearing of 17$^a$ and meshes at opposite sides with wormed rods 21 and 21$^a$, which are mounted within bearings 22 and 22$^a$. Meshing with rods 21 and mounted on pins 18, which are connected by a strip 23, are gears 24 and 24$^a$, which regulate the angle of the mirrors 16, so as to deflect rays centrally through the holders 17 and 17$^a$ to the telescopes 25. Mounted within the outer ends of telescopes 25 are mirrors 26, having fixed angles of forty-five degrees. Another gear, 27, is mounted on the extension 20 and meshes on one side with a smaller gear 28, mounted on a shaft 29, which extends through the casing and has an index 30 at its end. On the other side gear 27 meshes with a train of gears adapted to register the distances which the device is constructed to measure, said train of gears ending in mesh with a pinion 31, mounted on a shaft 32, which extends through the casing and has an index 33 at its end. Pinion 29 meshes with a train of gears ending in mesh with pinion 34, mounted on shaft 35 and having an index 36 at its end. Index 33 is so geared as to record any prearranged number of revolutions of index 36. The first of these gears may, if desired, only be toothed to mesh with gear 27 that portion of its periphery which will cause it to revolve only when the telescopes are moved forward, the remainder being smoothed to permit holders 17, connected to said gears, to swing backward without imparting unnecessary motion to the train of gears within the casing.

To determine the distance from the base, as represented by the common axis of holders 17, to a desired object, telescopes 25 are inserted and held by means of a small excrescent point $25^a$ on the end of the telescope, which engages a bayonet-slot (not shown) which holds the telescope in such a position that the mirror 26 will be plumb whether faced back or front. The telescopes are then moved forward by means of handle 4, which rotates a shaft $4^a$, having a gear $4^b$, which rotates a gear $5^a$, secured to a worm $5^b$, meshing with worms 21 and $21^a$. The gears and worms are of such size and pitch as to move the telescopes very little at each turn of the lever. When the object appears clearly visible to both eyes, the distance will be registered by index 36 33, or both. This movement of the telescopes and their holders causes rotary motion to be imparted to the train of gears and to 31, 32, and 33, and so on to 36, a sufficient distance to indicate accurately upon the dials the distance between the base and the object upon which the telescopes are focused. In other words, when R equals radius of one telescope, D equals distance of extreme range, C equals circumference of dial 5, and G equals the gearing for operating the indexes, then $R:D::C:G$.

To determine the distance between two objects removed from the base, the distance to each is obtained and the angle, and by simple rules of trigonometry the required distance may be found. Acute angles are registered by moving the telescopes backward, and obtuse angles are registered by turning one telescope round so that it will focus in the opposite direction to the other telescope and moving them forward. This movement will cause the gear 28 to be revolved by gear 27, and the mechanism operated by said gear is so adjusted that the index 30 will accurately indicate upon the dial 7 the degrees of the angles obtained. The formula for the marking of the dial 7 is: when C equals circumference of gear 27 and G equals gear 28, then C equals 4 G.

Should the object upon which the device is focused be at a point below the instrument, the distance of said object below the horizontal can be readily determined by obtaining the angle between a line extending from the object to the instrument and the horizontal. To secure this angle, the instrument is turned on one side into a horizontal position, such position being indicated by the level 3. The telescopes within the holders 17 and $17^a$ are then turned so that the object can be sighted through one of them.

The device is compact and can be readily adjusted so as to focus upon any object desired.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a casing having a binocular opening thereinto; of oppositely-extending tubular holders pivoted within the casing, mirrors within the holders and in line of vision with the binocular, parallel worms revolubly mounted within the casing, means for rotating the worms in opposite directions, a gear rigidly connected to the pivot of one of the holders and engaged at opposite sides by the worms, and means for swinging the holders in unison.

2. In a device of the character described, the combination with a casing having a binocular opening thereinto; of parallel worms revolubly mounted within the casing, means for rotating the worms in opposite directions, oppositely-extending telescope-holders pivoted within the casing, a gear connected to one of the pivots and meshing at opposite sides with the worms, mirrors pivoted within the holders and in line of vision with the binocular, and means operated by the worms for turning the mirrors.

3. In a device of the character described, the combination with a casing having a binocular opening thereinto; of oppositely-extending telescope-holders pivoted within the casing, mirrors therein and in line of vision with the binocular, means for moving the holders in opposite directions in unison, a distance-indicating dial upon the casing, an index, a second dial for indicating the number of revolutions of the index, an angle-indicating dial, indexes for the dials, a gearing operated in unison with the holders for rotating the indexes.

4. In a device of the character described, the combination with a casing having a binocular opening thereinto; of pairs of parallel deflecting-mirrors within the casing and in line of vision with the binocular, tubular telescope-holders pivoted within the casing and extending in opposite directions, mirrors pivoted within the holders and normally at an angle thereto, gearing connected to the holders and adapted to move the same in opposite directions, dials upon the casing, an index upon each dial, and gears operated by the holders for rotating each index.

In testimony whereof I affix my signature in presence of two witnesses.

JAMES GORDON STEWART.

Witnesses:
A. HENRI HITCHING,
H. HATHWAY.